F. T. ROBERTS.
BUMPER.
APPLICATION FILED OCT. 30, 1914.
1,195,735.                                                     Patented Aug. 22, 1916.
2 SHEETS—SHEET 1.
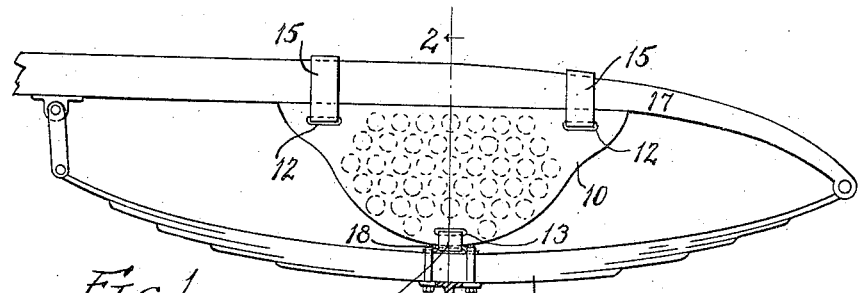
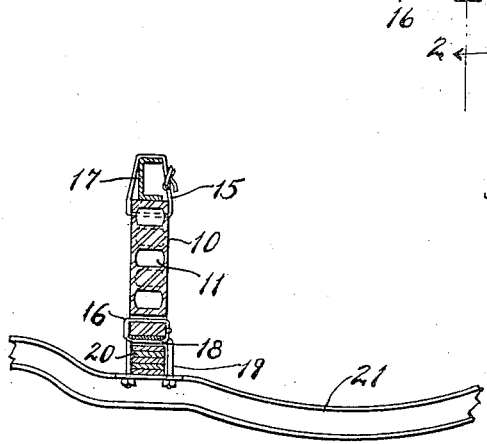
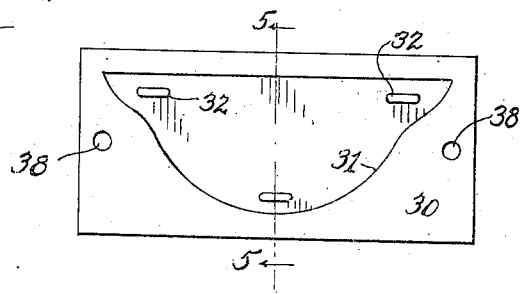
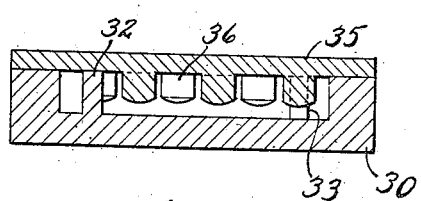
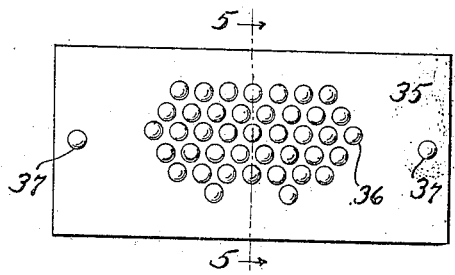
WITNESSES:
Justin W Machlin
Alice A. Glidden
INVENTOR
Fred Thomas Roberts
BY Albert N. Bates,
ATT'Y

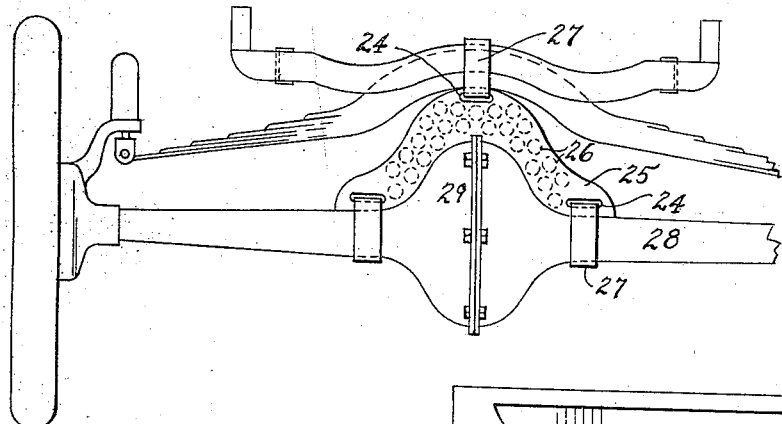
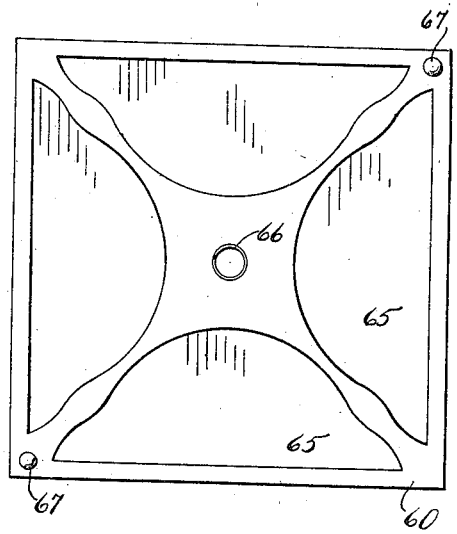
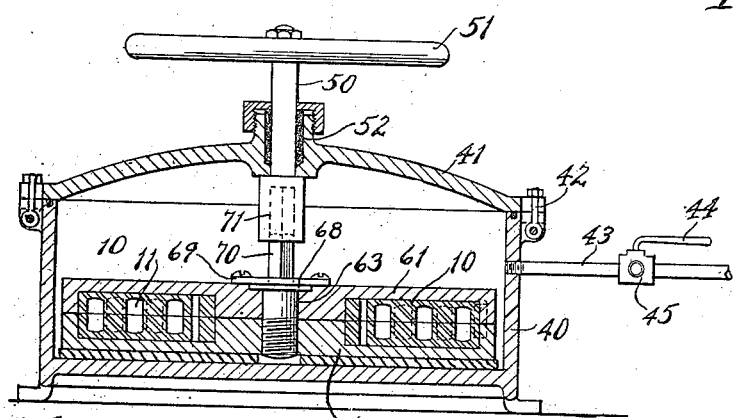

UNITED STATES PATENT OFFICE.

FRED THOMAS ROBERTS, OF TRENTON, NEW JERSEY, ASSIGNOR TO THE PARAMOUNT RUBBER COMPANY, OF CLEVELAND, OHIO, A CORPORATION OF OHIO.

BUMPER.

1,195,735.   Specification of Letters Patent.   Patented Aug. 22, 1916.

Application filed October 30, 1914. Serial No. 869,365.

*To all whom it may concern:*

Be it known that I, FRED THOMAS ROBERTS, a citizen of the United States, residing at Trenton, in the county of Mercer and State of New Jersey, have invented a certain new and useful Improvement in Bumpers, of which the following is a full, clear, and exact description, reference being had to the accompanying drawings.

The object of this invention is to provide a very resilient and at the same time durable rubber bumper.

The bumper is well adapted for use on vehicles; for example, automobiles. Its characteristics enabling it to produce the desired results in practice as well as to be cheaply manufactured are hereinafter more fully explained and are summarized in the claim.

In the drawings, Figure 1 is a side elevation of the portion of a vehicle equipped with one of my bumpers between a semi-elliptical spring and the frame carrying the same; Fig. 2 is a cross section on the line 2—2 of Fig. 1; Figs. 3 and 4 are face views of two coöperating parts of the mold for making half sections of the bumper; Fig. 5 is an enlarged cross section on the line 5—5 of such two-part mold; Fig. 6 is a plan of one member of the two part holder for holding pairs of such bumper sections as are produced by the mold of Figs. 3, 4 and 5; Fig. 7 is a vertical section of a suitable apparatus for bringing together two coacting holders of the form shown in Fig. 6 within a chamber containing compressed air; Fig. 8 is a side elevation of a somewhat modified form of my bumper adapted for installation between a transverse automobile spring and the differential casing.

As shown in Figs. 1 and 2, 10 indicates the bumper which is preferably a parallel sided block of rubber having within it a number of closed cavities 11, each of which contains fluid under pressure. The bumper may conveniently be made in the approximately triangular or segmental form shown and may conveniently be provided with three slots 12 and 13 extending through solid parts of the bumper. Through these slots pass suitable straps 15 and 16 by which the bumper is secured in place. As shown, the straps 15 pass around the chassis frame member 17 while the strap 16 passes around a suitable plate 18 held by the shackles 19 which hold the leaves 20 of the spring to the axle 21.

Fig. 8 shows, at 25, a bumper operating under the same principle but having a slightly modified form. This bumper has the closed cavities 26 containing compressed fluid and has through its solid portion slots 24 through which pass straps 27 for holding it in place. Two of these straps are shown as passing around the rear tubular axle 28 while the other strap passes over the spring and its support. The lower face of this bumper is concaved to make it fit closer over the differential casing 29.

It is to be understood that the two forms of bumper shown are to be taken as illustrations of various modifications of shape which may be made according to the requirements of use.

Figs. 3 to 7 inclusive illustrate means for making the bumper, and, in the specific form shown are adapted for making the bumper of Figs. 1 and 2, but modifications of shape enable similar means to produce bumpers of other forms, as will be well understood.

Referring to Figs. 3, 4 and 5, 30 indicates a mold plate or block having a cavity 31 with a flat bottom and a wall conforming to the contour desired for the bumper. Rising from the base of the cavity are projecting lugs 32 designed to make the slots for the straps. 35 indicates the coöperating mold plate which is adapted to lie against the face of the block 30 and has a series of projecting pegs or pins 36 which are adapted to occupy the cavity 31 but do not reach the bottom thereof. Fig. 5 shows the blocks 30 and 35 in coöperating position. The lugs 32, it will be seen, reach from the base of the cavity 31 to the inner face of the plate 35, while the pins 36 leave a clear space beneath them and above the base of the cavity 31. A suitable registration of these two mold parts may be effected by providing one of them with dowel pins 37 and the other with corresponding holes 38.

In operating the mold just described, a piece of soft rubber is placed in the cavity 31 and the plate 35 is pressed against the block 30, thus pressing the rubber into the available space between the blocks. This produces a half section of the bumper having one closed side and the other side provided with a number of open cavities made by the pegs 36. Two of such half sections are then secured together in an atmosphere of compressed fluid, whereby the finished bumper is produced with the entrapped fluid.

Figs. 6 and 7 illustrate means for bringing the bumper sections together in an atmosphere of compressed fluid. As shown, 40 indicates a suitable chamber provided with a cover 41 which may be secured thereto in air-tight manner by bolts 42. 43 indicates a pipe adapted to conduct compressed air to the chamber under the control of a cock 44. This cock may be provided with a discharge opening 45 to release the air pressure within the chamber when the handle of the cock is turned transversely. Rotatably mounted in the cap 41 of the chamber is a socket wrench 50 shown as provided with a hand wheel 51 and extending through a stuffing box 52.

The chamber described is adapted to contain a pair of plates or holders 60 and 61 which have cavities for bumper sections and are shown as provided with a screw 63, whereby the plates may be drawn together and held in such position. For the specific bumpers shown I have arranged plates as shown in Fig. 6, wherein the plate has four cavities 65 arranged about a center and the screw occupies a threaded opening 66 at the center. The plate 60 shown in Fig. 6 is provided with dowel pins 67 which occupy openings in the plate 61. The plate 61 is similar to the plate 60 except that the central hole thereof is not screw threaded. The screw 63 may be held to the plate 61 by means of a collar 68 on the screw held in a cavity of the plate by a small clamping plate 69. The screw has an angular shank 70 which slidably engages the socket 71 at the lower end of the wrench 50.

In operating the apparatus shown in Figs. 6 and 7 the semi-cured half sections of the bumpers are placed in the cavities 65 with their solid faces at the base of the cavities. Cement is placed on the other face of the bumper section around the open cavities therein and the two plates containing such parts somewhat separated are placed in the compression chamber 40. This fluid under pressure, preferably compressed air, is admitted through a pipe 43, and, while this air pressure is maintained, the hand wheel 51 is turned, turning in the screw 63 and bringing the bumper sections together and entrapping compressed air in the openings 11 of the bumpers. Then the air pressure is relieved, the cap 41 is removed, the plates 60 and 61 are submitted to vulcanizing heat which may conveniently be accomplished by transferring them to any suitable vulcanizer. After the bumper sections with the entrapped air have been heated the desired time the plates are separated and the completed bumpers removed.

It will be seen from the above description that the bumper of this invention may be very cheaply manufactured. When completed it is extremely elastic by reason of the air and pressure; at the same time it is very durable. The portions of the rubber between the individual openings constitute cross ties from one side of the bumper to the other, giving it the necessary strength. At the same time, by making a series of individual cavities the durability is increased, because wear or damage which opens a few only of the cavities would not seriously interfere with the operation of the bumper. As shown, the bumper is secured in use at its opposite edges so that it resists both the strain tending to compress the bumper and the strain tending to stretch it, and it thus acts as an effective shock absorber for either direction of movement. By reason of the fact that the cavities are filled with air under pressure above the atmosphere, this air, rather than the rubber, supports the load and takes the shock, and thus the desired elasticity is provided in a bumper which is strong and durable.

Having thus described my invention, what I claim is:

As a new article of manufacture, a bumper comprising a substantially parallel sided block of rubber having in it a large number of transverse parallel cavities, each entirely inclosed by the rubber itself, and fluid under greater pressure than the atmospheric pressure in each of said cavities.

In testimony whereof, I hereunto affix my signature in the presence of two witnesses.

FRED THOMAS ROBERTS.

Witnesses:
 IRA F. SMITH,
 HERBERT R. STRAUSS.